United States Patent Office 3,182,775
Patented May 11, 1965

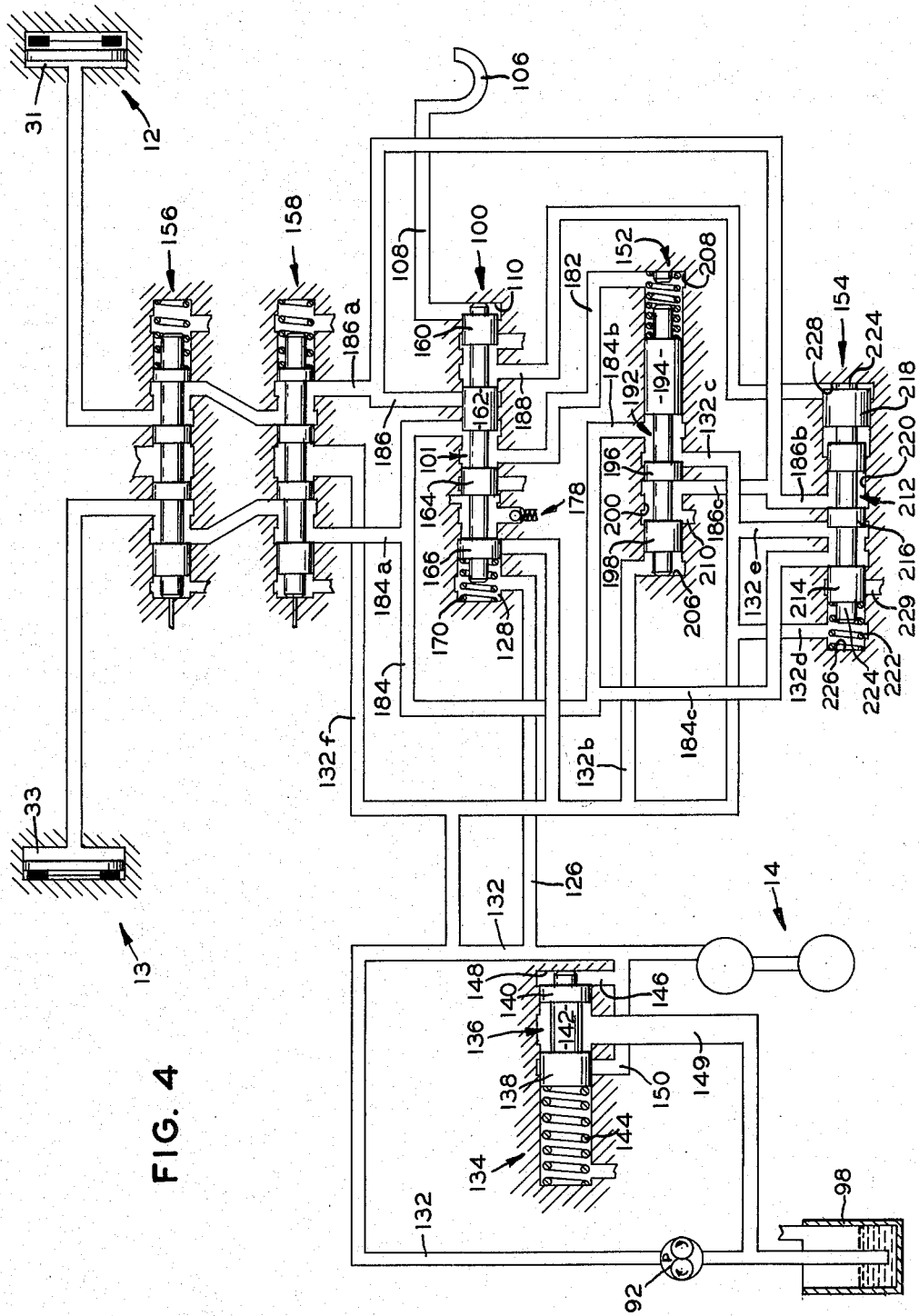

3,182,775
HYDROKINETIC CONVERTER WITH MULTIPLE CLUTCHES AND CONTROL MEANS TO SIMULTANEOUSLY OR SELECTIVELY ENGAGE THE SAME
Myron M. Schall, Toledo, Ohio, assignor to Dana Corporation, Toledo, Ohio, a corporation of Virginia
Filed Aug. 30, 1962, Ser. No. 220,364
8 Claims. (Cl. 192—3.2)

The present invention relates generally to control systems and more particularly to a control system for a transmission of the type having a plurality of clutches adapted to be engaged simultaneously or selectively depending upon operating conditions and the desires of the operator.

The transmission to which the present invention has been applied is one which requires two clutches; one clutch for the torque converter stage, and another for the direct drive stage. These clutches require controls for engaging either clutch individually for driving, engaging both clutches simultaneously for hydrodynamic braking or disengaging both clutches for a neutral condition. However, this control system is not limited to the particular transmission described but may be found useful in other applications.

In many automatic transmissions, changing between the various speed ratios or stages is accomplished by the use of highly complex electrical systems. Other controls utilize fluid pressure which is varied in accordance with the speed of rotation of an element of the transmission by metering the fluid through a valve which is positioned by centrifugal force. Still other control systems utilize complex mechanical means to accomplish the automatic shifting of the transmission. All these systems are relatively complex, expensive, and difficult to control and maintain.

Therefore, it is an object of this invention to provide a completely hydraulic control system for a change speed transmission or the like, which system automatically controls the engaging of the clutches of the transmission by responding to a predetermined change in the transmission speed level and torque requirement.

It is another object of this invention to provide an improved control system that will accurately and automatically react to a change in speed and torque requirements of the vehicle, thereby activating the desired change in the power flow through the transmission.

It is yet another object of this invention to provide an improved hydraulic control system for a transmission which will accurately and automatically react to changes in hydraulic pressures resulting from changes in the speed and torque requirements of the vehicle and prime mover therefor and thereby activate the shifting of the transmission.

It is still another object of this invention to provide a hydraulic control system for a transmission having an inherent hysteresis so that the downshift or reshifting of the transmission will take place at a lower speed than the original shift or upshift. Therefore, the momentary power loss during the shifting cycle and resulting loss in speed does not cause the control system to hunt.

It is a further object of this invention to provide an improved and simplified control system which is entirely hydraulic, simple, and inexpensive to manufacture and service.

It is a still further object of this invention to provide a control system for a transmission having a torque converter stage and a direct drive stage which system provides for the momentary simultaneous engagement of the clutches of both stages during the shifting thereof so that the source of power for the transmission does not race during the shifting cycle.

Yet a further object of this invention is to provide a completely automatic hydraulic control system for a transmission or the like having a first and a second channel of power flow, which system determines the channel through which the power is transmitted in response to a pair of fluid pressure sources, one pressure source varying in response to the input speed to the transmission and the other pressure source varying in response to the output speed of the transmission.

Yet a still further object of this invention is to provide such a control system for a transmission including valve means acted upon by the pair of pressure fluids so that the position of, and therefore the controlling by, the valve means is dictated by the difference between the pressure fluid.

It is yet another object of this invention to provide such a control system including manual override means to accommodate hydrodynamic braking or a neutral condition.

Other and further objects and advantages of this invention will be readily apparent from the following description and a consideration of the accompanying illustrations wherein;

FIG. 4 is a diagrammatic view of another embodiment of this invention in an operational condition according to FIG. 2.

Figure 1:
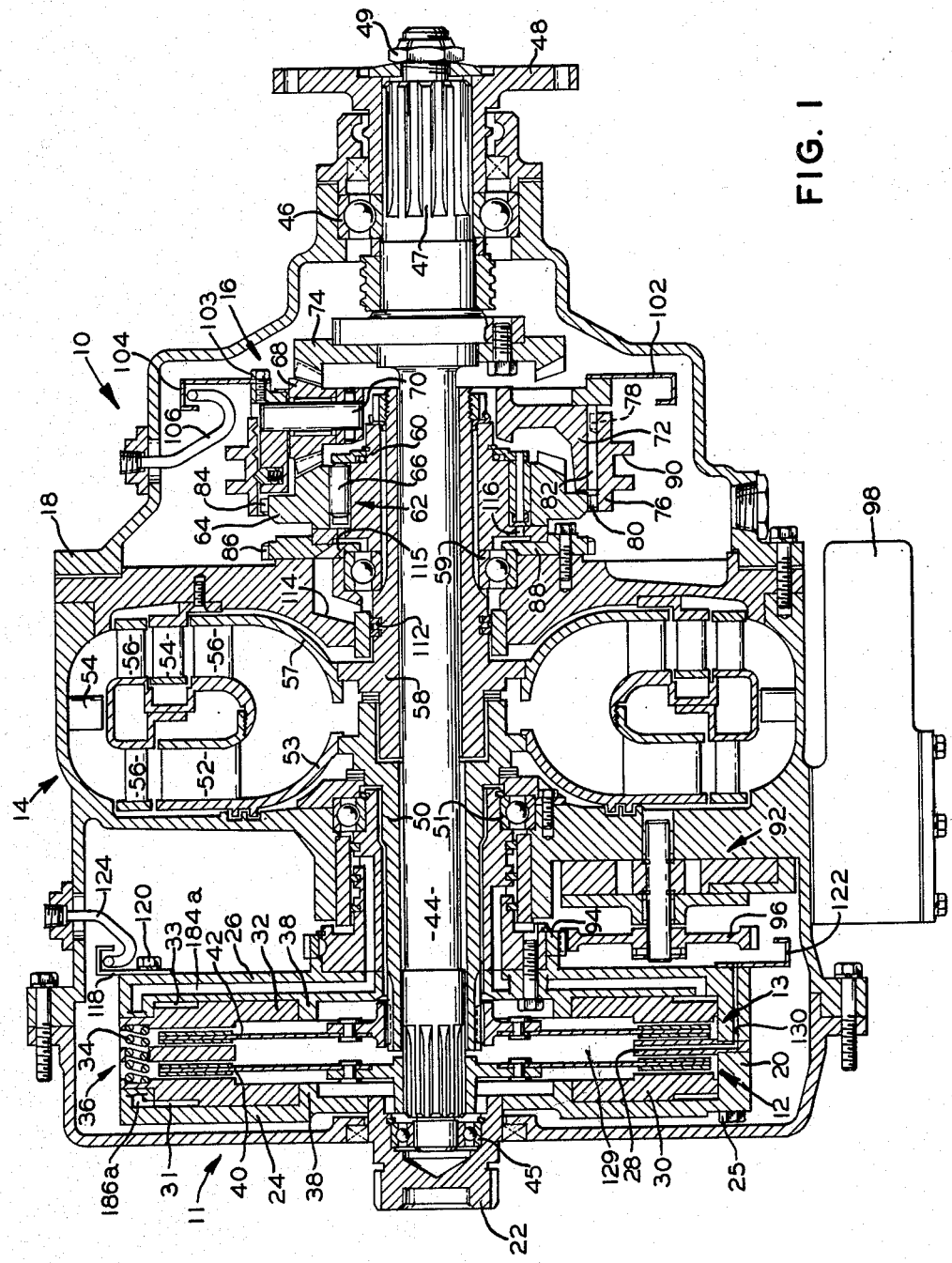
FIG. 1 is a longitudinal view in section of a change stage transmission utilized with the control system of this invention.

Referring to the drawings, the transmission shown generally at 10 comprises a double clutch section 11, a torque converter section 14, and a forward-neutral-reverse section 16 enclosed in a case 18. The clutch section 11 includes a pair of clutches 12 and 13 disposed in a hollow annular flywheel 20 mounted for unitary rotation on an input shaft 22 rotatably mounted in the case 18. The flywheel has a pair of axially spaced radially extending flanged walls 24 and 26. The flanged walls 24 and 26 have a common annular driving plate 28 disposed therebetween and extending radially inwardly from the flanged portion thereof. The walls 24 and 26 and the plate 28 are suitably fixed connected by means of a plurality of bolts 25.

Slidably received for relative axial movement in the flywheel 20 are a pair of spaced pressure plates 30 and 32; the plate 30 being positioned between the driving plate 28 and the wall 24 and the plate 32 being positioned between the driving plate 28 and the wall 26. The pressure plates 30 and 32 are normally biased axially apart against the walls 24 and 26 by a plurality of springs 34 interposed therebetween and are each connected for unitary rotation and axial movement relative to the flywheel 20 in a suitable manner as by a plurality of lugged connections shown generally at 36. Each wall 24 and 26 is provided with a circumferential rib 38 which extends inwardly therefrom and each engages the radially inward portion of the pressure plates 30 and 32, thereby defining a chamber 31 and 33 respectively between each wall 24 and 26 and the respective pressure plate 30 and 32; the chambers being operable to receive fluid pressure adapted to force the pressure plates inwardly against the bias of the spring 34.

Rotatably mounted in and relative to the flywheel 20 are a pair of driven disks 40 and 42; the disk 40 being disposed between the pressure plate 30 and the driving plate 28 and the disk 42 between the pressure plate 32 and the driving plate 28. The disks 40 and 42 are adapted to be compressed by the pressure plates 30 and 32 respectively against the driving plate 28 whereby they are operatively connected in a driven relationship to the flywheel 20. The pressure plate 30, driven disk 40 and driving plate 28 comprise the direct drive clutch 12, while the pressure plate 32, the driven disk 42 and the driving plate 28 comprise the torque converter clutch 13 of the dual clutch 11.

A through shaft 44 is rotatably mounted at its forward end in the input shaft 22 by means of a pocket bearing 45 and extends rearwardly therefrom for the full length of the transmission 10, in which it is rotatably mounted by means of a bearing 46, and terminates in a splined portion 47 extending rearwardly from the transmission. A flange 48 is splined on the portion 47 and secured thereto by means of a lock nut 49 threadedly carried by the end of the shaft 44. The driven disk 40 is splined for unitary rotation and relative axial movement on the forward end of the shaft 44 and adapted to drive the same, while the driven disk 42 is radially spaced from the through shaft 44 and is drivingly splined for relative axial movement to a hollow torque converter drive shaft 50 through which the shaft 44 passes in radial spaced relationship.

The drive shaft 50 is rotatably mounted in the case 10 by means of a bearing 51 and is drivingly connected to a plurality of impeller blades 52 of the three stage torque converter section 14 by an impeller shell 53. The impeller blades 52 are adapted to cooperate with a plurality of stator blades 54, secured to the case 18, to hydrokinetically impart drive to a plurality of turbine blades 56. The turbine blades 56 are drivingly connected by a turbine shell 57 to a hollow converter output shaft 58 which is rotatably mounted in the case 10 by a bearing 59 and through which the shaft 44 passes in radial spaced relationship.

The converter output shaft 58 transmits drive from the torque converter section 14 to the differential type forward-neutral-reverse section 16 of the transmission 10. More particularly, an inner race 60 of an overrunning clutch 62 is splined for unitary rotation to the rearward end of the shaft 58. The inner race 60 is adapted to be drivingly connected to an outer race 64, in the form of a side gear, of the clutch 62 by means of a plurality of one way driving rollers 66. The outer race or side gear 64 is constantly meshed with a plurality of pinion gears, one of which is shown at 68, which pinion gears are each rotatably mounted on a pinion shaft 70 fixedly secured to an annular pinion carrier 72 and adapted for unitary rotation about the through shaft 44. The pinion gears 68 are constantly in mesh with a second side gear 74 securely mounted on the through shaft 44 for rotation therewith.

An annular shift collar 76, having axially spaced internal splines 78 and 80 is disposed about the pinion carrier 72. The splines 78 of the collar 76 are constantly drivingly engaged with elongated splines 82 on the periphery of the carrier 72 and are adapted for axial sliding relative thereto. The splines 80 of the collar 76, upon forward movement of the collar, are adapted to alternately engage a peripheral spline portion 84 on the side gear 64 and a peripheral spline portion 86 on a gear 88 secured to the case 10 or to be disposed therebetween in a disengaged position. The collar 76 is provided with a peripheral slot 90 adapted to be engaged by a shifting mechanism (not shown) which is operative to cause the axial movement thereof in response to actuation by the operator.

When the splines 80 of the collar 76 are engaged with the splines 84 of the side gear 64, the drive transmitted to the side gear 74 will be in the same direction as that to the gear 64 and the section 16 will be in forward drive. When the splines 80 of the collar 76 are engaged with the splines 86 of the stationary gear 88, the side gear 74 will be driven in a direction opposite to the side gear 64 and the section 16 will be in reverse drive. When the splines 80 are disposed between the splines 84 and 86, the section 16 will be in a neutral condition and no drive will be transmitted to the side gear 74.

It is apparent that, when the pressure plate 30 presses the driven disk 40 against the plate 28, and the pressure plate 32 is spaced from the disk 42, drive will be transmitted from the input shaft 22 directly to the through shaft 44. Because of the overrunning clutch 62, the shaft 44 will not drive the turbine blading of the converter section 14 and since the pressure plate 32 has not engaged the disk 42, the input shaft 22 will not drive the converter drive shaft 50. Under these conditions, the transmission 10 will be in direct drive, with the converter section 14 disassociated from both the input and output shafts.

When the pressure plate 32 presses the driven disk 42 against the plate 28, and the pressure plate 30 is spaced from the disk 40, the through shaft 44 will not be directly driven by the input shaft 22 which is now drivingly connected to the converter drive shaft 50. The drive shaft 50 hydrokinetically drives the side gear 64 through the converter output shaft 58. Depending upon the engaged position of the clutch collar 76, the side gear 64 will drive the second side gear 74 in forward or reverse, which in turn drives the through shaft 44.

When both the pressure plates 30 and 32 press the driven disks 40 and 42 against the plate 28, the transmission will be in both converter and direct drive. This condition is useful during braking when the advantage can be taken of the braking effect of both the prime mover and the converter in a well known manner.

A gear pump 92 is adapted to be driven by the flywheel 20 by means of a gear 94 secured to the flywheel and meshed with a gear 96 drivingly connected to the pump. The pump 92 supplies pressure fluid from a sump 98 of the case 18 to the converter section 14 and to the control system of the transmission 10 to actuate the operation of the clutch section 12.

The control system is of the hydraulic type and includes a pilot valve 100 (FIG. 2) the valve stem 101 of which is positioned in response to the difference in value of a pair of control pressure fluids. One of the pressure fluids is adapted to be varied in accordance with variations in the input speed to the transmission 10 while the other pressure fluid is adapted to be varied in accordance with variations in the output speed of the transmission.

Means is provided to generate the control pressure fluid. More particularly, as shown in FIGS. 1–4, the pinion carrier 72 has an annular channel member 102 secured to the periphery thereof as by a plurality of bolts 103 and having the open portion thereof facing the carrier. Positioned within a U-shaped peripheral portion 104 of the channel 102 is a Pitot tube 106. The U-shaped portion 104 is adapted to be filled with fluid, and since the carrier 72 will always rotate unitarily with the through shaft 44 when the transmission 10 is in forward drive, the fluid rotating in the portion 104 will cooperate with the Pitot tube 106 as it moves relative thereto to generate a control fluid pressure which varies in accordance with the output speed of the transmission 10. The Pitot tube 106 is joined by a line 108 to a chamber 110 in the valve 100 positioned to the right of the valve stem 101 so that the fluid pressure generated by the Pitot tube 106 is adapted to react upon the right end of the valve stem 101 and urge the same to the left.

Means is provided to insure that the channel 104 is constantly supplied with fluid when the prime mover is driving the flywheel 20 to energize the pump 92 which supplies the control system and the converter section 14 with pressure fluid. The torque converter section 14, being filled with pressurized fluid, is provided with a labyrinth type seal 112 between the converter output shaft 58 and the case 18. However, since the converter section 14 is pressurized, there is always a certain amount of leakage past the seal 112, which leakage passes through a channel 114 in the case 18, an opening 115 in the gear 88, an opening 116 in the inner race 60, then past the rollers 66, between the pinion 68 and the pinion shaft 70 and to the channel member 102. This fluid is held circumferentially within the U-shaped portion 104, except for the overflow, by centrifugal force whenever the output shaft 44 is rotated.

Fluid pressure generating means responsive to the input speed is also provided. More particularly, in a first embodiment shown in FIGS. 1–3, the flywheel 20 has an annular channel member 118 secured to the periphery thereof as by a plurality of bolts 120. Positioned within a U-shaped peripheral portion 122 of the channel 118 is a second Pitot tube 124. The U-shaped portion 122 is adapted to be filled with fluid and since the flywheel 20 is always rotating unitarily with the input shaft 22, the rotating fluid in the portion 122 will cooperate with the Pitot tube 124, as it moves relative thereto, to generate a control fluid pressure which varies in accordance with the input speed to the transmission 10. The Pitot tube 124 is joined by a line 126 to a chamber 128 disposed to the left of the valve stem 101 of the valve 100 so that the fluid pressure generated by the Pitot tube 124 is adapted to react upon the left end of the valve stem 101 and urge the same to the right.

Means is provided to insure that the channel 122 is supplied with fluid when the prime mover is driving the flywheel 20 and either the direct or converter clutch 12 or 13 is engaged. When pressure fluid is admitted to either chamber 31 or 33 of the clutch 12 or 13 thereby engaging one of the same, a certain amount of the engaging pressure fluid will leak between the rib 38 on the wall 24 and the pressure plate 30, or between the rib 38 on the wall 26 and the pressure plate 32, thereby entering the space 129 within the flywheel 20. A passage way 130 is formed radially in the driving plate 28 and axially in the flanged wall 26 of the flywheel 20 so that the fluid pressure which has leaked into the space 129 can flow out of the passage way 130 into the channel 118 where it is held circumferentially by centrifugal force within the U-shaped portion 122, except for overflow, whenever the flywheel is rotating.

Another embodiment of the structure for supplying control fluid pressure to the chamber 128 of the valve 100, which structure is responsive to variation in the speed of the input to the transmission, is shown in FIG. 4. In this embodiment, the line 126 which is confluent with the chamber 128 to the left of the pilot valve 100 is joined to a pump output line 132 adapted to conduct pressure fluid from the pump 92 to the torque converter section 14 and to the control system. Since the pump 92 is driven by the meshing of the gear 96 and the gear 94 carried by the flywheel 20, the output in the pump will vary in accordance with the input speed to the transmission.

A bypass pressure regulating valve 134 is provided for the pump 92 to maintain the pressure thereof within a determined range. The valve 134 includes a valve stem 136 having a pair of spaced apart shoulders 138 and 140 connected by a reduced portion 142 and also includes a boss projecting from the right end thereof and adapted to engage the inner right wall of the valve 134 to limit the travel to the right of the stem 136. The valve stem 136 is normally biased to the right against the right wall of the valve 134 by a compression spring 144. A line 146 joins the pump output line 132 to a chamber 148 formed in the valve 134 to the right of the shoulder 140. With the stem 136 biased to the right, a second line 149 enters the valve at the reduced section 142 of the stem 136 and is adapted to vent the same to the sump 98. A third line 150 enters the valve at the position of the shoulder 138 and is blocked thereby; this line connects the valve with the pump output line 132. When the pump 92 is pumping pressure fluid, the fluid enters the chamber 148 and reacts upon the right side of the shoulder 140. When the biasing effect of the fluid in the chamber 148 exceeds the biasing effect of the spring 144, the stem 136 is biased to the left. This leftward movement continues until the shoulder 138 uncovers the line 150 so that the pump output line 132 may discharge some of the fluid contained therein to the sump 98 thereby reducing the pressure in the output line to a controlled level in a well known manner. However, this pressure is adapted so that it does not remain constant but does increase along with the increased output of the pump 92. This is accomplished by using a spring 144 with a relatively high rate so that its biasing effect upon the valve stem 136 increase markedly as it is compressed by movement of the stem to the left. For this reason the pressure in the chamber 148 required to originally open the line 150 must be continuously increased in order to further bias the stem to the left and further open the vent line. Therefore, the pressure in the line 132 which is conducted to the chamber 128 of the valve 100 by the line 126, varies in accordance with the input speed of the transmission 10.

Figure 2:
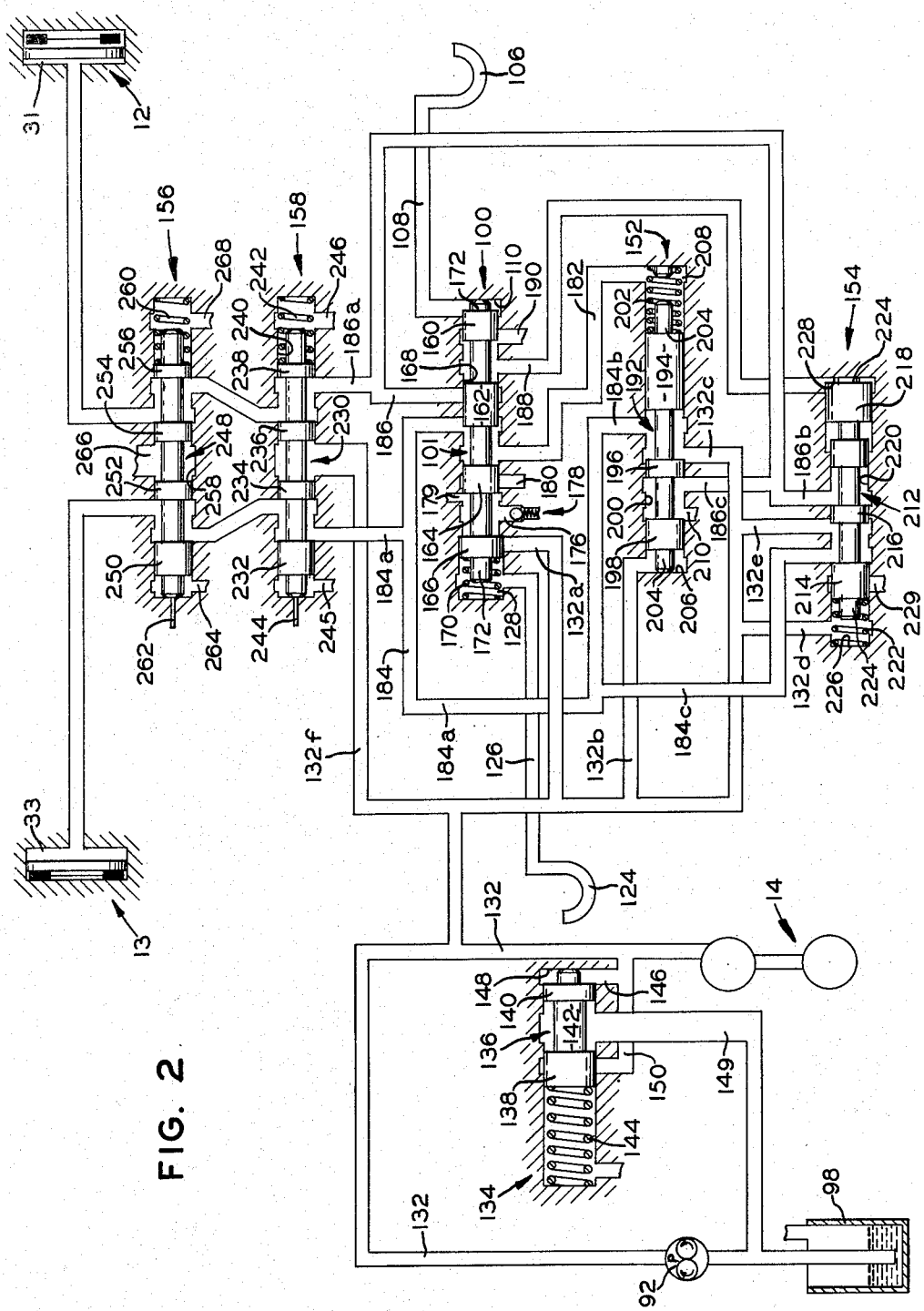
FIG. 2 is a diagrammatic view of the control system of this invention with the transmission in one operational stage.
Figure 3:
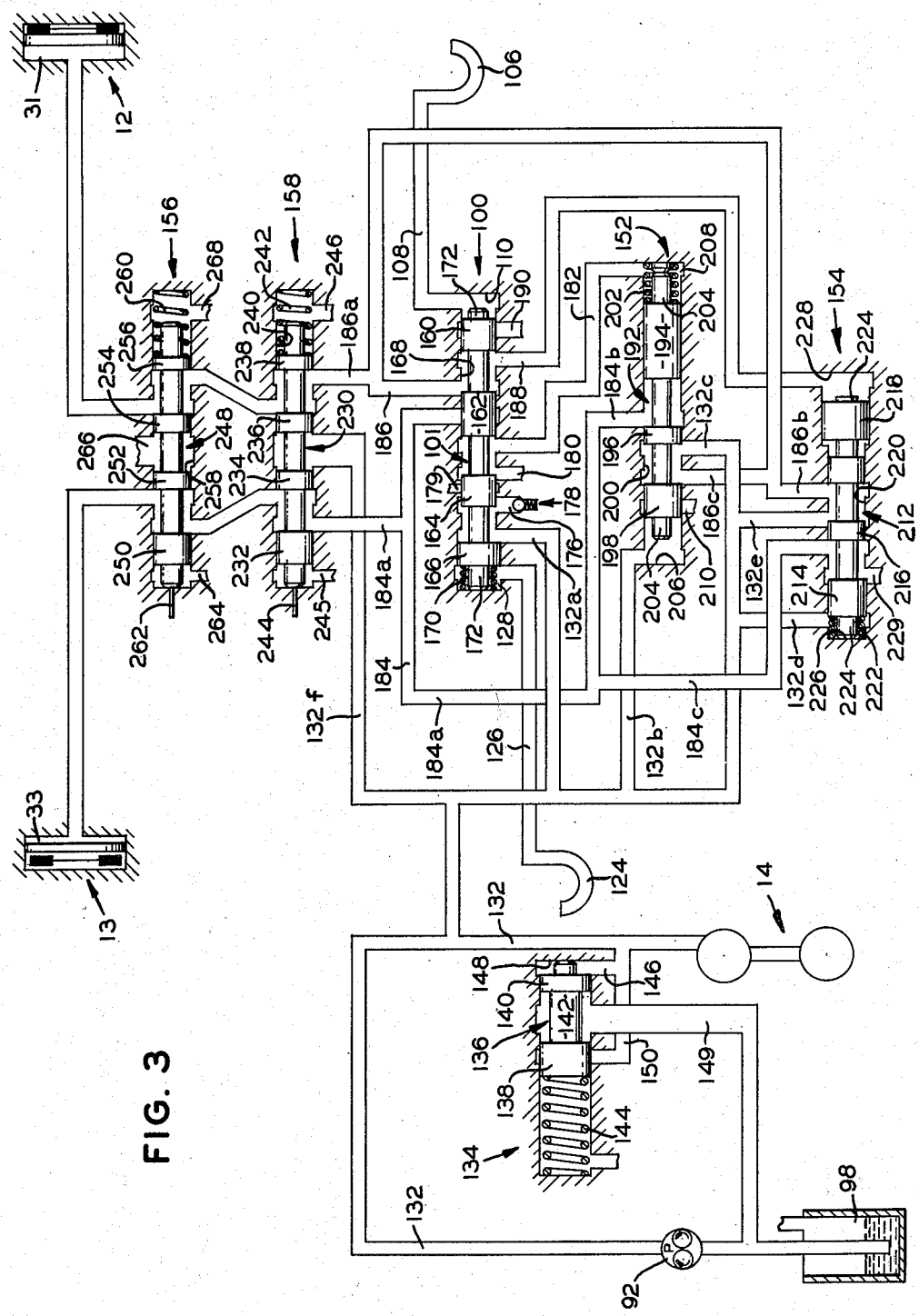
FIG. 3 is a view according to FIG. 2 with the transmission in another stage of operation.

The control system for this transmission is comprised of two portions, an automatic portion and a manual override portion. The automatic portion of the control system includes the aforementioned pilot valve 100, a downshift lag valve 152, and an upshift lag valve 154. The manual override portion of the control system includes a declutch valve 156 and a hydrodynamic braking valve 158. The control system as shown in FIGS. 2 and 4 is in a condition whereby the torque converter clutch 13 is engaged and the direct drive clutch 12 is disengaged. In FIG. 3 the control system is shown with a direct drive clutch 12 engaged and the converter clutch 13 disengaged.

The pilot valve stem 101 has spaced lands 160, 162 and 164 of equal diameter and land 166 of larger diameter in a closed bore 168 of the valve 100. A spring 170 engages the wall at the left end of the bore 168 and the land 166 to normally urge the valve stem 101 to the right until the same engages the right wall of the bore. Bosses 172 are provided on the ends of the valve stem 101 to insure that when the stem is engaging either wall, the chambers 110 and 128 remain open.

With the valve stem 101 positioned to the right in the converter clutch engaged position, and commencing in order from left to right, the following lines and vents enter the bore 168 of the valve 100. The line 126 from the source of pressure fluid responsive to input speed (i.e., either Pitot tube 124 or pump output line 132) enters the bore 168 to the left of land 166 and is adapted to remain open even when the valve stem 101 is biased to the left. A line 132a confluent with the pump output line 132 enters the bore at a position which is blocked by the land 166, and a vent line 176 leading to the sump 98 enters at a position between the lands 166 and 164. The vent line 176 is provided with a ball type valve 178 which is spring loaded to an open position and adapted to vent the area between the lands 166 and 164 of fluid leakage until the line 132a becomes confluent therewith through movement of the valve stem 101. When this occurs, fluid pressure from the passage way 132a will close the spring biased ball valve 178 so that pressure may be built up in the bore 168 between the lands 166 and 164. A second vent line 179 to the sump 98 enters the bore 168 between the lands 166 and 164 at a position closer to the land 164 than the vent 176. The vent 179 is of small cross section so that a relatively small initial leftward movement of the land 164 will block the same. Another vent line 180, leading to the sump 98, enters at a position blocked by the land 164. A line 182 from the downshift lag valve 152 enters the bore 168 between the lands 164 and 162, and a line 184 also enters the bore between the lands 164 and 162. The line 184 has branches 184a which extend through the brake and declutch valves 158 and 156 to the chamber 33 of the converter clutch 13, and 184b and 184c which extend to the downshift and upshift lag valves 152 and 154 respectively.

Continuing to the right, the next line 186 which enters the bore 168 is blocked by the land 162 and has branch lines 186a, 186b, and 186c. The branch 186a extends through the brake and declutch valves 158 and 156 to the chamber 31 of the direct drive clutch 12; the branch 186b extends to the upshift lag valve 154, and the branch 186c extends to the downshift lag valve 152. A line 188 leading to the upshift lag valve 154 and a vent line 190 leading to the sump 98 enter the bore 168 between the lands 160 and 162, and the farthest line to the right entering the bore 168 at the chamber 110 is the line from Pitot tube 106 as previously described.

The downshift lag valve 152 includes a valve stem 192 having spaced lands 194, 196 and 198 of equal diameter in a closed bore 200. A spring 202 engages the wall at the right end of the bore 200 and the land 194 to normally urge the valve stem 192 to the left until the same engages the left wall to the bore. Bosses 204 are provided on both ends of the valve stem 192 to insure that when the stem is engaging either the left or right wall, chambers 206 and 208 remain respectively between the lands 198 and 194 and the end walls of the bore 200.

With the valve stem 196 positioned to the left as shown in FIGS. 2 and 4 in the converter clutch engaged position, and commencing in order from the left to the right, the following lines and a vent enter the bore 200 of the valve 152. The line 132b, confluent with the pump output line 132, enters the bore 200 at the chamber 206 and is adapted to remain open even when the valve stem 192 is biased to the left as shown. A vent line 210 to the sump 98 and the line 186c, which is confluent with the line 186b to the valve 154, 186a to the direct drive clutch 12 and 186 to the pilot valve, enter the bore 200 between the lands 196 and 198. The lines 132c and 184b enter the bore 200 between the lands 194 and 196; the line 132c being confluent with the pump output line 132 and the line 184b being confluent with the line 184a to the converter clutch 13 and the line 184 to the pilot valve 100. The last line to the right entering the bore 200 is the line 182 from the valve 100 which line enters the chamber 208 to the right of the land 194 and is adapted to be open at all times.

The upshift lag valve 154 includes a valve stem 212 having spaced lands 214 and 216 of equal diameter and a land 218 of larger diameter in a closed bore 220. A spring 222 engages the wall at the left end of the bore 220 and land 214 to normally urge the valve stem 212 to the right until the same engages the right wall of the bore. Bosses 224 are provided at the ends of the valve stem 212 to insure that when the valve stem is engaging the left or the right wall, chambers 226 and 228 remain respectively between the lands 214 and 218 and the wall of the bore 220.

With the valve stem 212 positioned to the right as shown in FIGS. 2 and 4 in the converter clutch engaged position, and commencing in order from the left to the right, the following lines and a vent enter the bore 220 of the valve 154. The line 132d, confluent with the pump output line 132, enters the bore 220 at the chamber 226 and is adapted to remain open even when the stem 212 is biased to the left. The vent line 229 enters the bore 220 at a position blocked by the land 214. The line 184c and a line 132e, confluent with the pump output line 132, enter the bore between the lands 214 and 216 while the line 186b enters the bore between the lands 216 and 218. The last line to the right entering the bore 220 is the line 188 from the pilot valve 100 which enters the chamber 228 to the right of the land 218 and is adapted to be open at all times.

The brake valve 158 of the manual override portion of the control system includes a valve stem 230 having spaced lands 232, 234, 236 and 238 of equal diameter in a closed bore 240. A spring 242 engages the wall at the right end of the bore 240 and the land 238 to normally urge the valve stem 230 to the left until the same engages the left wall of the bore. Manually operable means in the form of an actuating rod 244 is secured to the left end of the valve stem 230 and extends externally of the valve 158 and is adapted to be urged to the right by the operator against the bias of the spring 242 to change the operative position of the valve stem.

With the valve stem positioned to the left by the biasing effect of the spring 242 as shown, and commencing from the left, the following lines enter the bore 240 of the valve 158. The vent line 245 enters the bore to the left of the land 232 to prevent the build-up of leakage pressure therein which would tend to interfere with shifting of the valve stem 230. The line 184a passes through the bore 240 in an offset position between the lands 232 and 234. A branch 132f of the pump output line 132 enters the bore 240 between the lands 234 and 236, while the line 186a also passes through the bore 240 in an offset position between the lands 236 and 238. A vent line 246 to the sump 98 enters the bore 240 to the right of the land 238 to prevent the build-up of pressure therein due to leakage which would inhibit the shifting of the valve stem 230.

The declutch valve 156 of the manual override portion of the control system includes a valve stem 248 having spaced lands 250, 252, 254 and 256 of equal diameter disposed in a closed bore 258. A spring 260 engages the wall at the right end of the bore 258 and the land 256 to normally urge the valve stem 248 to the left until the same engages the left wall of the bore. A manually operable means in the form of an actuated rod 262 is secured to the left end of the valve stem 248 and extends externally of the valve 156 and is adapted to be urged to the right by the operator against the bias of the spring 260 to change the operative position of the valve stem.

With the valve stem 248 positioned to the left, as shown, by the biasing effect of the spring 260 and commencing from the left, the following lines enter the bore 258 of the valve 156. A vent line 264, leading to the sump 98, enters the bore 258 to the left of the land 250 to prevent the build-up of leakage pressure therein which would tend to inhibit shifting of the valve stem. The line 184a passes through the bore 258 in an offset condition between the lands 250 and 252 and a vent line 266 enters the bore at a position between the lands 252 and 254. The line 186a also passes through the bore 258 in an offset position between the lands 254 and 256. A vent line 268 to the sump 98 enters the bore 258 to the right of the land 256 to prevent the build-up of leakage pressure therein which would tend to inhibit the shifting of the valve stem 248.

*Operation*

Since the valves 100, 152 and 154 are normally spring biased to the converter clutch engaged position even with no fluid pressure available from the pump 92, when the prime mover is energized to initially rotate the flywheel 20, the control system of the transmission 10 is in the converter drive condition. Referring to FIGS. 2 and 4, at this time the pilot valve 100 is being acted upon by the pressure fluid in the chamber 128 and the fluid pressure in chamber 110, with the spring 170 acting in an additive manner to the fluid in chamber 128. Therefore, until the fluid pressure in the chamber 110, which is responsive to the output speed of the transmission, exceeds the combined effect of the spring 170 and the fluid pressure in the chamber 128, which is responsive to input speed, the valve stem 101 will remain in the converter drive position. The effective areas of the lands 166 and 160 and the biasing effect of the spring 170 may be selected whereby the shift point takes place at any desired speed ratio.

Due to the well known slip characteristics of a torque converter such as the one shown at 14, it is apparent that with a full throttle acceleration the control system will remain in converter drive until a higher output speed is attained than would be the case with part throttle acceleration. This condition is highly desirable since the greatest torque multiplication is obtained in converter drive and, therefore, the control system in addition to being speed responsive is responsive to torque requirements.

With the valves in the converter drive position, the following conditions exist. Fluid pressure from the pump output line 132 passes through the branch line 132e, the valve 154, and the line 184c to the line 184a and simultaneously passes through the branch line 132c, the valve 152 and the line 184b also to the line 184a. The combined pressure fluids in the line 184a pass through the brake and declutch valves 158 and 156 to the chamber 33 of the converter clutch 13 and bias the pressure plate 32 into engagement with the clutch disk 42 to drivingly connect the converter input shaft 50 to the flywheel 20. The pressure fluid in the line 184a also passes through the line 184, valve 100, and line 182 to the chamber 208 in the downshift lag valve 152 where its effect on the land 194 comibnes with that of the spring 202 to act upon the valve stem 192 and maintain the same biased to the left against the biasing effect of the fluid in the chamber 206 upon the stem; the chamber 206 being constantly supplied with pressure fluid through the line 132b from the pump output line 132.

At this time, the line 186a to the chamber 31 of the direct drive clutch 12, which passes through the declutch and brake valves 156 and 158 and is confluent with the line 186c, is vented through the downshift lag valve 152 by means of the vent line 210. The line 188 to the chamber 228 on the right of valve 154 is also vented at this time by the valve 100 through the vent line 190 so that no biasing force is acting on the right side of the valve stem 212. The stem 212 is being biased to the right by the comibned force of the spring 222 and the pressure fluid in chamber 226 which chamber is always confluent with the pump output line 132 to the branch line 132d.

When the fluid pressure in the chamber 110 to the right of the valve stem 101 of the pilot valve 100, generated by the action of the Pitot tube 106 in response to the output speed of the transmission 10, becomes sufficient so that its effect on the land 160 biases the valve stem 101 to the left against the biasing effect of the spring 170 and the fluid in the chamber 128 acting on the land 166, the following actions take place and upon completion of the shifting sequence the valves assume the position shown in FIG. 3. Initial movement of the land 164 covers the vent line 179 and as the land 166 is carried to the left by the stem 101, the same uncovers the line 132a from the pump output line 132. The fluid pressure from the output line 132 fills the area between the lands 166 and 164 and closes the ball check valve 178. Since the land 166 is greater in diameter than the land 164, the differential effective force of the fluid combines with force from the fluid pressure in the chamber 110 and carries the stem 101 to the left so that the shifting of the pilot valve 100 occurs with a snap action and no hunting of the valve takes place.

The land 162 of the valve 100 now blocks the line 184 so that the same is no longer confluent with the line 182 leading to the chamber 208 of valve 152, while the land 164 unblocks the vent line 180 so that the line 182 and the chamber 208 of the downshift valve 152 are confluent with the line 180 and are vented to the sump. The land 162 also unblocks the line 186 so that the same becomes confluent with the line 188 to the chamber 228 of valve 154, while the land 160 moves to block the vent 190 so that the line 188 is no longer vented. However, at this time no pressure fluid is present in the lines 186 and 188.

Since the line 182 and chamber 208 of the downshift lag valve 152 are now vented through the pilot valve 100, the biasing effect on the right end of the valve stem 192 of the valve 152 has been reduced to the spring 202 alone. The spring 202 is chosen so as to have a biasing effect less than the biasing effect of the pump output fluid pressure in the chamber 206 of the left of the stem 192 so that the latter pressure now biases the stem 192 to the right.

The land 198 moves with the stem 192 and blocks the vent line 210 so that the line 186c, which is confluent with the lines 186a to the direct drive clutch 12, 186b from the valve 154, and 186 to the valve 100, is no longer vented. The land 196 moves to the right and blocks the line 184b, which leads to the line 184a and the converter clutch 13, from the line 132c so that the clutch 13 no longer receives pressure fluid from the line 184b; however, the clutch 13 at this time still receives pressure fluid from the line 184c. In moving to the right, land 196 also joins line 132c and 186c in a confluent relationship so that fluid from the pump output line 132 may enter the lines 186c, 186 and 186a. The fluid in line 186a passes to the direct drive clutch 12 and commences to engage the same as the pressure in the chamber 31 thereof builds up to the pressure determined by regulator 134. At this time the converter clutch 13 is still receiving pressure fluid through the line 132e, valve 154 and lines 184c and 184a.

The pressure fluid in line 186a to the direct drive clutch 12 also passes through confluent line 186, valve 100, line 188 and into the chamber 228 at the right end of the enlarged land 218 of the valve 154 and reacts against the same to bias the stem 212 to the left against the combined biasing force of the spring 222 and the fluid pressure in the chamber 226 from the pump output line 132. The diameter of the lands 218 and 214 and the biasing effect of the spring 222 are selected so that the pressure in the chamber 228 has to substantially attain the pressure determined by regulator 134 before it is able to bias the stem 212 to the left, so that the clutch 12 is substantially engaged before the stem 212 is biased to the left. The land 214 now uncovers the vent line 229 and the land 216 becomes interposed between the line 132e and the line 184c so that line 184c is blocked from the pump output line 132 and is vented to the sump 98 through the vent line 229. The line 184c and the line 184a confluent therewith vent the converter clutch 13 which then disengages. It is therefore apparent that the upshift lag valve 154 maintains the converter clutch 13 in engagement until the direct drive clutch 12 is engaged. The land 216 in moving to the left places the lines 186b and 132e in a confluent relationship so that the clutch 12 receives pressure fluid from the pump output line 132 from two sources, the line 132c and the line 132e.

With the control system of the transmission 10 in the direct drive condition as shown in FIG. 3, having assumed this condition after the above described upshifting sequence, the valve stem 101 of valve 100 is being held to the left, the direct drive position, by the combined biasing effect of the fluid pressure in the chamber 110, generated by the Pitot tube 106, and the differential fluid pressure from the line 132a differentially acting upon the large land 166 and the small land 164. These combined biasing forces acting to the left are resisted by the combined biasing force of the spring 170 and the fluid pressure in the chamber 128; the pressure in the chamber 128 being generated either by the Pitot tube 124 as shown in FIGS. 2 and 3 or conducted from the pump output line 132 by the line 126 as shown in FIG. 4. When the combined force biasing the valve stem 101 to the right exceed those biasing the stem to the left, either because of a decrease in the fluid pressure in chamber 110, an increase in the fluid pressure in chamber 128, or a combination of both, the following sequence of events will occur in the downshifting of the transmission 10 to the converter drive condition.

Before proceeding to the sequence of events, it should be noted that upon upshifting, the fluid pressure in chamber 110 was the only biasing force available to bias the valve stem 101 to the left to initiate the shifting sequence, while upon downshifting, the valve stem 101 is being biased to the left by both the fluid pressure in chamber 110 and the differential biasing effect of the fluid pressure from the line 132a acting upon the lands 166 and 164. Therefore, upon downshifting the combined forces biasing the stem to the right must overcome the combined forces biasing the stem to the left, rather than just the fluid pressure in chamber 110 so that the downshift will take place at a lower output speed or at a greater torque requirement than the upshift. This hysteresis is very desirable to prevent hunting of the control system and, additionally, on slowing of the vehicle, the transmission 10 will remain in the direct drive condition to a lower vehicle speed than the upshift speed so that the prime mover is available to aid in slowing the vehicle (engine braking).

Upon the valve stem 101 being biased to the right, the land 166 will block line 132a so that the fluid pressure from the pump output line 132 no longer enters the area between the lands 166 and 164, which area will then be vented initially by vent line 179 until the pressure is lowered sufficiently so that the ball check valve 178 is biased open and the vent 176 aids in venting this area. The vent 180 is blocked by land 164, and the line 182 extending to the valve 152 and line 184 extending to the converter clutch 13 become confluent. However, no fluid pressure is present in these lines at this time. The land 162 blocks line 186 leading to the direct drive clutch 12 and maintains the pressure therein while the clutch still obtains pressure fluid from the lines 186b and 186c at this time. The vent line 190 is unblocked by the land 160 and vents the line 188 and the chamber 228 of the valve 154 confluent therewith.

With the fluid pressure vented from chamber 228, the valve stem 212 of the valve 154 is biased to the right by the combined effective force of the spring 222 and the fluid pressure in chamber 226. Vent 229 becomes blocked by land 214 and land 216 moves to bring the lines 184c and 132e into a confluent relationship and blocks the line 186b from the line 132e. This terminates the flow of fluid pressure through the lines 132e and 186b to the direct drive clutch 12, which at this time still receives fluid pressure from the lines 132c and 186c, and initiates the flow of pressure fluid from the line 132e to the line 184c. Since the lines 184 and 184a are confluent with the line 184c, fluid now flows to the converter clutch 13 and commences to engage the same while simultaneously flowing through the line 184, valve 100 and line 182 to the chamber 208 of the valve 152.

When the clutch 13 is substantially engaged so that the pressure therein approaches the fluid pressure in line 132, the combined effective force of the fluid in chamber 208 and the spring 202 biases the valve stem 192 of the downshift lag valve 152 to the left against the biasing force of the fluid pressure in the chamber 206. At this time both the direct drive clutch 12 and the converter clutch 13 are engaged. The final connection between the direct drive clutch 12 and the pump output line 132 is terminated when the land 196 of the valve stem 192 blocks line 132c from line 186c as the stem 192 moves to the left. The clutch 12 is then vented of pressure fluid by the land 198 unblocking the vent 210 so that line 186c and vent 210 are confluent. By moving leftwardly, the land 196 brings the lines 184b and 132c into confluent relationship so that the converter clutch 13 is now receiving fluid pressure from both the upshift and downshift valves 154 and 152. It is now apparent that on downshifting, the downshift valve 152 maintains the direct drive clutch 12 engaged until after the converter clutch is engaged and then allows the clutch 12 to be vented and disengaged.

The brake valve 158 of the terminal override control system is provided for hydrodynamic braking purposes and is operable to cause the simultaneous engagement of both the direct drive and converter clutches 12 and 13. In this manner both the braking effect of the prime mover and the converted 14 are obtained. In response to movement of the rod 244 to the right, the stem 230 is moved to the right against the bias of the spring 242. This movement results in the land 232 blocking the upstream portion of line 184a and the land 236 moving between the offset portions of the line 186a so that the valves 152 or 154 can not vent either of the clutches 12 or 13. The land 234 assumes a medial postion with respect to the large inlet line 132f from the pump output line 132 to the bore 240 so that the line 132f is in a confluent relationship with the portions of lines 184a and 186a downstream of the valve 158, and is operative to supply pressure fluid to both clutches 12 and 13. Upon release of the rightward force of the rod 244 and movement of the valve stem 232 to its leftward postion by spring 240, the upstream and downstream portions of lines 184a and 186a are returned to a confluent relationship and the clutch engagement is again dictated by the automatic control system.

The declutch or neutralizing valve 156 of the manual override control system is operable to cause the simultaneously disengagement of the direct drive and the converter clutches 12 and 13. In response to movement of the rod 262 to the right, the valve stem 248 of the valve 156 is moved to the right against the biasing effect of the spring 260. This results in the land 250 blocking the upstream portion of line 184a, and land 252 moving to medial position relative to the large vent line 266 so that the downstream portion of the line 184a and the vent 266 are in confluent relationship. The land 254 moves between the upstream and downstream portions of the line 186a so that the same are no longer confluent and the downstream portion of the line 186a is now confluent with the vent 266. The vent 266 vents the lines 184a and 186a and the clutches 12 and 13 so that both clutches are disengaged. Upon release of the rightward force of the rod 262 and movement of the valve stem 248 to its leftward position by the spring 260, the upstream and downstream portions of lines 184a and 186a are returned to a confluent relationship and the clutch engagement is again dictated by automatic control system.

While only two embodiments of this invention have been shown and described, it is readily apparent that many changes can be made in both the structure and operation thereof without departing from the scope of this invention as defined by the appended claims.

What is claimed is:

1. The combination with a transmission of a type having
   (1) an input means,
   (2) an output means,
   (3) a pair of power paths between said input and output means each including a fluid pressure operated clutch operative to engage the respective power path to said input and output means,
   (4) and fluid pressure generating means adapted to supply fluid pressure to engage said clutches,
   of a control system including,
       (a) a main control valve for directing the flow of pressure fluid alternately to said clutches,
       (b) means supplying a pair of signal fluid pressures for acting on said control valve whereby said control valve determines the direction of the flow of pressure fluid, said means supplying a pair of signal fluid pressures comprising
           (1) a first signal fluid pressure generating means for supplying one fluid pressure to said control valve and being variable in response and in proportion to the rotation of said input means,
           (2) a Pitot tube for supplying the other of said signal fluid pressures to said control valve and (3) means carried by said output means and cooperative with said Pitot tube to generate said other signal fluid pressure, (4) whereby the position of said control valve is determined by the effect of said signal pressure fluids acting on said control valve.

(c) and a first and a second lag valve, (1) said first drive valve being operative to maintain said first power path connecting said input and output means until said second power path connects said input and output means, and (2) said second lag valve being operative to maintain said second power path connecting said input and output means until said first power path connects said input and output means.

2. The combination with a transmission of the type having, (1) an input means, (2) an output means, (3) a first and a second power path means including a first and a second fluid pressure operated clutch means respectively, said power path means being operative to alternately connect said input and output means, (4) a fluid pressure pump means for supplying fluid pressure to actuate said clutches, (5) and means for conducting fluid pressure from said pump means to said clutch means, of a control system including:

(a) a main positionable control valve interposed in said conducting means and operative to direct the flow of fluid pressure alternately to said first and second clutches, (1) said control valve including a axially movable valve stem having alternate axial positions, (b) a pair of fluid pressure signal means each being operative to generate a signal pressure, (c) means for conducting said signal fluid pressure from each of said signal means to opposite ends of said valve stem so that said pair of signal fluids act in opposition to position said valve stem, (d) one of said signal means including a Pitot tube and fluid carrying means rotatable with said output means and cooperable with said Pitot tube to generate a signal fluid pressure, (e) the other of said signal fluid pressure means being associated with said input means and operative to generate a signal fluid pressure in response to and in proportion to the rotation of said input means, (f) whereby the position of said valve stem is determined by the effect of said signal pressure fluids acting on the same, (g) said control system also including a first and a second lag valve, (1) said first lag valve being operative to maintain said first power path means connecting said input and output means until said second power path means connects said input and output means, and (2) said second lag valve being operative to maintain said second power path means connecting said input and output means until said first power path means connects said input and output means.

3. The combination with a transmission of the type having (1) input and output elements, (2) a first power path means including a hydrokinetic torque converter and a first fluid pressure operated clutch means, (3) a second power path means including a second fluid pressure operated clutch means, said power path means being operative to alternately connect said elements, (4) fluid pressure pump means for supplying fluid pressure to actuate said first and second clutch means, (5) means for conducting fluid pressure from said pump means to said clutch means, of a control system including (a) a first and a second lag valve each having a first and an alternate position and being interposed in said conducting means, (1) said first lag valve in its first position being operative to conduct fluid pressure to said first clutch means and remains in such first position until said second clutch means is engaged and being operative in its alternate position to vent said first clutch means and direct fluid pressure to said second clutch means, (2) said second lag valve in its first position being operative to vent said second clutch means and direct fluid pressure to said first clutch means and in its alternate position to direct fluid pressure to said second clutch means and remains in such alternate position until said first clutch means is engaged, (b) and a main control valve being interposed in said conducting means and being operative to position said lag valves in their first and alternate positions in response to at least the speed of one of said elements.

4. The combination defined in claim 3 wherein said main control valve is normally positioned so that the same positions said lag valves in their first positions, and upon increase in the speed of said one element said main control valve first causes said second lag valve to move to its alternate position and direct fluid pressure to said second fluid clutch means and signal said first lag valve to move to its alternate position which the latter does upon the engagement of said second clutch means and in so doing said first lag valve means no longer conducts fluid pressure to said first clutch means and vents the same and begins to direct fluid pressure to said second clutch means, said main control valve being operative upon decrease in speed of said element to move to its original position thereby inducing said first lag valve to move to its first position wherein the same ceases to vent said first clutch means and commences to conduct fluid pressure to the same and said second lag valve upon the engagement of said first clutch means moves to its first position wherein the same vents said second clutch means and directs fluid pressure to said first clutch means.

5. The combination defined in claim 4 wherein said one element is the output element and a first and a second means acting in opposition to each other control the position of said main control valve, said first means being at least a spring means which positions said main control valve in its normal position and said second means being a source of signal fluid pressure which is generated by a means supplying said fluid pressure in response and in proportion to the rotation of said output means.

6. A transmission comprising in combination (a) an input means, (b) an output means, (c) a hydrokinetic torque converter means drivingly connected to said output means, (d) means including a first fluid pressure actuated clutch adapted to drivingly connect said converter means and said input means, (e) direct drive means drivingly connected to said output means,
(f) means including a second fluid pressure actuated clutch adapted to drivingly connect said input means to said direct drive means,
(g) overrunning clutch means interposed between said converter means and said direct drive means so that said direct drive means may overrun said converter means,
(h) pump means for supplying fluid pressure to actuate said clutches,
(i) means for conducting fluid pressure from said pump means to said clutch means,
(j) a control system including
   (1) a main positionable control valve and
   (2) lag valve means interposed in said conducting means and operative to alternately direct the flow of fluid pressure to and vent said first and second clutches,
   (3) said control valve including an axially movable valve stem having alternate axial positions,
   (4) in one of the alternate positions of said valve stem said lag valve means passes fluid pressure to one of said clutches and vents the other of said clutches,
   (5) and in the other alternate position of said control valve said lag valve means passes control fluid to the other of said clutches and vents said one clutch,
   (6) said lag valve means being operative to maintain the flow of fluid pressure to said one clutch when passing engaging fluid pressure to said other clutch until said second clutch is engaged and operative when passing engaging fluid pressure to said one clutch to maintain flow of fluid pressure to said other clutch until the engagement of said one clutch,
   (7) a pair of fluid pressure signal means each being operative to generate a signal fluid pressure,
   (8) means for conducting said signal fluid pressure from each of said signal means to opposite ends of said valve stem so that said pair of signal fluids act in opposition to position said valve stem,
   (9) one of said signal means including a Pitot tube and fluid carrying means rotatable with said output means and cooperable with said Pitot tube to generate a signal fluid pressure,
   (10) the other of said signal fluid pressure means being associated with said input means and operative to generate a signal fluid pressure in response to and in proportion to the rotation of said input means,
   (11) whereby the position of said valve stem is determined by the effect of said signal pressure fluids acting on the same.

7. A transmission according to claim 6 wherein the other of said signal fluid pressure means includes a Pitot tube and fluid carrying means rotatable with said input means and cooperable with said Pitot tube to generate a signal fluid pressure.

8. A transmission according to claim 6 wherein the other of said signal fluid pressure means includes a pump means drivingly connected to said input means.

References Cited by the Examiner
UNITED STATES PATENTS

| | | |
|---|---|---|
| 2,691,940 | 10/54 | McFarland. |
| 2,756,616 | 7/56 | Forster. |
| 2,794,349 | 6/57 | Smirl. |
| 2,822,901 | 2/58 | Forster. |
| 2,866,361 | 12/58 | Gatiss. |
| 2,913,931 | 11/59 | Hilpert. |
| 3,096,666 | 7/63 | Christenson et al. |
| 3,101,012 | 8/63 | Christenson et al. |

DAVID J. WILLIAMOWSKY, *Primary Examiner.*

UNITED STATES PATENT OFFICE
CERTIFICATE OF CORRECTION

Patent No. 3,182,775　　　　　　　　　　　　May 11, 1965

Myron M. Schall

It is hereby certified that error appears in the above numbered patent requiring correction and that the said Letters Patent should read as corrected below.

Column 2, line 49, for "fixed" read -- fixedly --; column 6, line 15, after "136" insert -- will --; column 9, line 38, for "comibned" read -- combined --; column 11, line 75, for "terminal" read -- manual --.

Signed and sealed this 21st day of September 1965.

SEAL)
Attest:

ERNEST W. SWIDER
Attesting Officer

EDWARD J. BRENNER
Commissioner of Patents